Sept. 5, 1967     W. G. PETTITT     3,340,508
NORMALLY INACTIVE SUPERVISORY CONTROL SYSTEM
WITH DESIGNATED ORDER OF STATION SELECTION
Filed Nov. 26, 1963     2 Sheets-Sheet 1

INVENTOR.
W.G.PETTITT
BY
HIS ATTORNEY

United States Patent Office 3,340,508
Patented Sept. 5, 1967

3,340,508
NORMALLY INACTIVE SUPERVISORY CONTROL SYSTEM WITH DESIGNATED ORDER OF STATION SELECTION
Walter George Pettitt, Rochester, N.Y., assignor to General Signal Corporation, Rochester, N.Y., a corporation of New York
Filed Nov. 26, 1963, Ser. No. 326,143
8 Claims. (Cl. 340—147)

The present invention relates to supervisory control systems, and it more particularly pertains to systems for starting normally inactive multiple station supervisory control systems.

It is well known that the high speed of solid state multiple station code communication systems makes it possible to scan quickly all of the control stations in a multiple station system, and thereby, when scanning repeatedly, to provide for the maintaining of control devices remote from a control office at substantially all times in correspondence with corresponding binary switches at a control office. This mode of operation is not desired for some applications of multiple station supervisory control systems, such as for centralized traffic control systems for railroads, wherein it is desired that controls be transmitted in a manually designated order, and wherein it is desirable to be able to preset some of the control devices before the transmission of the controls which they select is rendered effective. It is therefore desirable in using solid state code communication systems for centralized traffic control (CTC) that the systems be made normally inactive, and that the systems may be initiated for transmission of control codes to any one designated field station or location upon designation of a start control for the system as by the actuation of a start button for a selected field location.

The system according to the present invention provides a means for starting a normally inactive code communication system by the use of solid state storage and control apparatus for the respective field locations. This apparatus is subject to control in accordance with the designation of a start for transmission of a selected code to the corresponding field location.

The start storage and control apparatus associated with each station comprises a start storage switch, a reset timer, an encoder control switch and an inhibit switch. The function of the start storage switch is to store a designated start for the associated station until the system initiates transmission to the associated field station. The reset timer switch restores the start storage switch after a cycle has been initiated for transmission to the associated location, and the reset timer switch also actuates the encoder control switch to start the operation of the code communication system. The encoder switch remains in its turned on condition until the end of a cycle of operation for transmission to the associated field location. The inhibit switch is for the purpose of controlling the energization of an inhibit connection to the start storage and control apparatus for the next location in a predetermined order so as to provide a chain circuit organization to render transmission effective for only a single location at one time, even though start designations may be stored contemporaneously for a plurality of locations. It is also provided that where there are a plurality of control stations at one field location, a single start storage and control apparatus at the control office is used for all stations at that location, and a station counter is provided for sequencing transmission to the respective stations associated with the same field location.

An object of the present invention is to provide solid state start storage and control apparatus at a control office for each of a plurality of field stations in a normally inactive code communication system, wherein such apparatus for the respective field locations is controlled in a manner to initiate transmission to the different field locations successively in a predetermined order when starts have been designated for the associated stations.

Another object of the present invention is to inhibit the start storage apparatus for each field location from initiating the code communication system into a cycle of operation, provided that a cycle of operation has been initiated for transmission to another field location.

Another object of the present invention is to sequence the transmission to a plurality of field stations at a particular field location when a start is stored for transmission to that field location.

Other objects, purposes and characteristic features of the present invention will be in part obvious from the accompanying drawings and in part pointed out as the description of the invention progresses.

In describing the invention in detail, reference is made to the accompanying drawings, wherein similar reference characters are used to refer to corresponding parts throughout the drawings; and in which.

Figure 1:
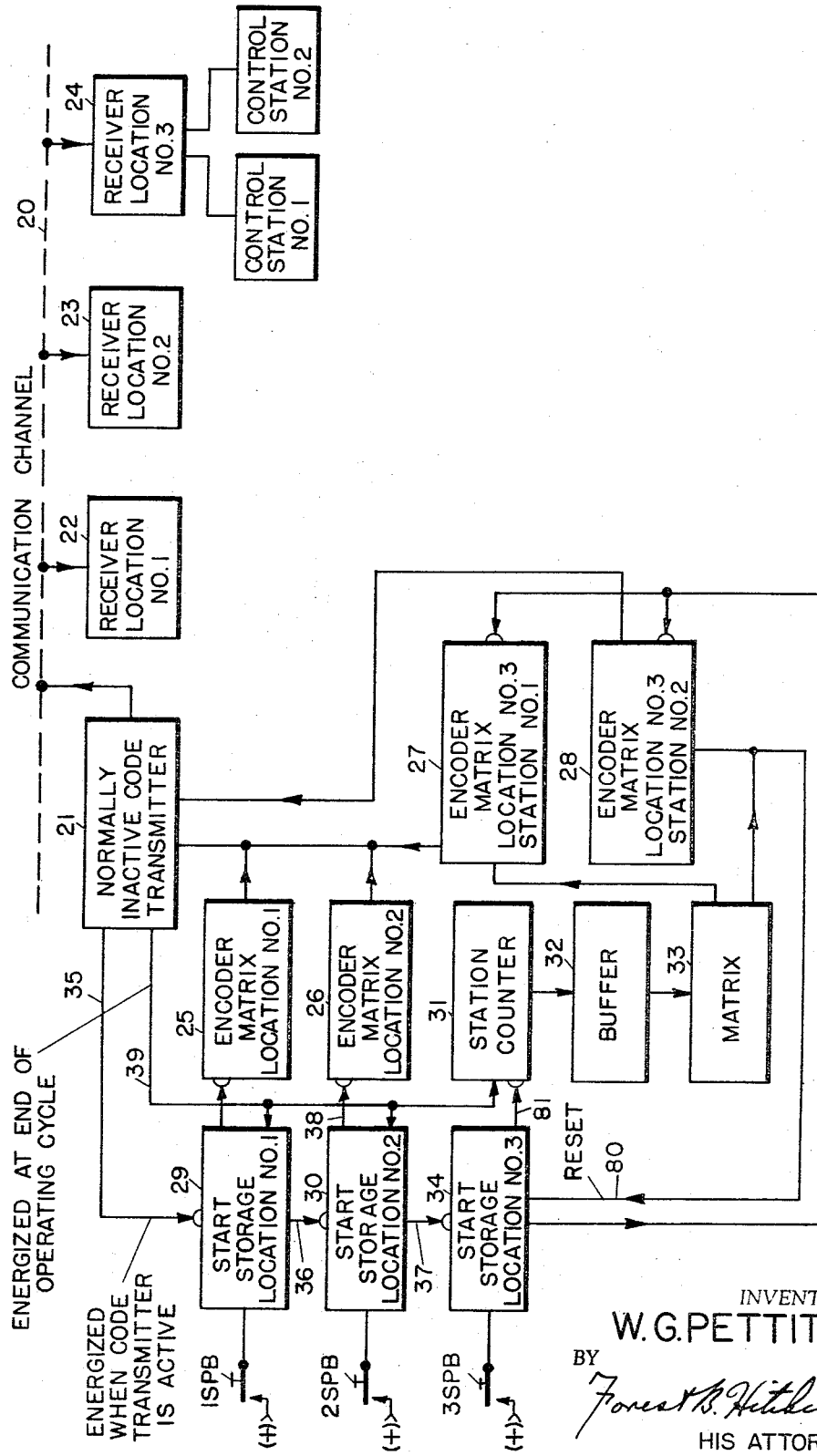
FIG. 1 is a block diagram of a normally inactive code communication system according to one embodiment of the present invention for the transmission of control codes from a control office over a communication channel to a plurality of field locations.

With reference to FIG. 1, a system embodying the present invention is illustrated by block diagram for the transmission selectively of control codes to several field locations over a suitable Communication Channel 20. The system comprises a Normally Inactive Code Transmitter 21 at the control office and a receiver at each of several field locations, such as Receiver 22 for location No. 1, Receiver 23 for location No. 2, and Receiver 24 for location No. 3. The Receiver 24 for location No. 3 is illustrated as having associated therewith Control Station No. 1 and Control Station No. 2.

An encoder matrix is provided at the control office for each location and for each station of a multiple station location. Thus the Encoder Matrix 25 is provided for location No. 1, the Encoder Matrix 26 is provided for location No. 2, and Encoder Matrices 27 and 28 are provided for stations Nos. 1 and 2 at location No. 3. The Encoder Matrix 25 is controlled by a Start Storage 29 for location No. 1, and similarly the Encoder Matrix 26 is controlled by Start Storage 30 for location No. 2. The Encoder Matrices 27 and 28 are controlled selectively as determined by a Station Counter 31, Buffer 32 and Matrix 33 in accordance with the condition of Start Storage 34 for location No. 3. The outputs of the Start Storages 29, 30 and 34 for the control of their associated encoder matrices are of an inhibit nature, which is normally effective to maintain the associated encoder matrix ineffective to control the Normally Inactive Code Transmitter 21.

Start push buttons 1SPB, 2SPB and 3SPB are provided for governing the Start Storages 29, 30 and 34 respectively. It is to be understood that the push buttons SPB are only representative of one form for designating a start for the code communication system, and that other means such as relays and the like may be used in accordance with the requirements of practice.

It will be noted, with reference to FIG. 1, that the Start Storages 29, 30 and 34 are connected in series as far as inhibit energization is concerned. That is, the start storage 29 is inhibited to prevent a start from becoming effective when the Code Transmitter 21 is active in accordance with the energization of wire 35 extending from the Normally Inactive Code Transmitter 21. Similarly, if a start is stored by the Start Storage 29, the Start Storage 30 is prevented from operating by inhibit energization of wire 36 connecting Start Storage 29 with Start Storage 30. When inhibit energy is applied to the wire 36 as an input to the Start Storage 30, this Start Storage has an output inhibit energization applied to wire 37 to inhibit the Start Storage 34. This energization is applied as long as there has been a prior start designation made for any different field location. In other words, the general mode of operation of the chain circuit inhibit organization just described is that inhibit energy is applied to all storages in the chain, once a start has been initiated for transmission of any field location. This organization provides that where there are several starts contemporaneously stored, they will be rendered effective in an order of priority in accordance with the order of the associated storages in the inhibit circuit chain.

Each of the Start Storages 29, 30 and 34 has an output which normally inhibits the encoder for the associated station. Thus, for example, the Start Storage 30 has an output on wire 38 which inhibits Encoder Matrix 26 for location No. 2 to prevent this encoder from acting upon the Normally Inactive Code Transmitter 21 to either start the transmitter or to control the coding of the transmitter.

Each of the Start Storages 29, 30 and 34 includes an Encoder Control Switch (see FIG. 2), which, when turned on, removes inhibit energy from the connection to the associated encoder matrix, such as by removing energy from wire 38 in the Start Storage 30. Means is provided for resetting this Encoder Control Switch at the end of a control cycle of operation in accordance with the application of a reset pulse to wire 39 by the Normally Inactive Code Transmitter 21. This pulse, in resetting the Encoder Control Switch for a start storage that has been active, removes inhibit energization from the inhibit control wire extending to the next start storage unit. Thus, for example, for the Start Storage 30, the resetting of the Encoder Control Switch included within that storage unit by a pulse applied to wire 39, removes inhibit energization from wire 37 to permit the Start Storage 34 to be effective to initiate a cycle of operation for the transmission of control codes to the location No. 3 if there are no other storages ahead.

Figure 2:
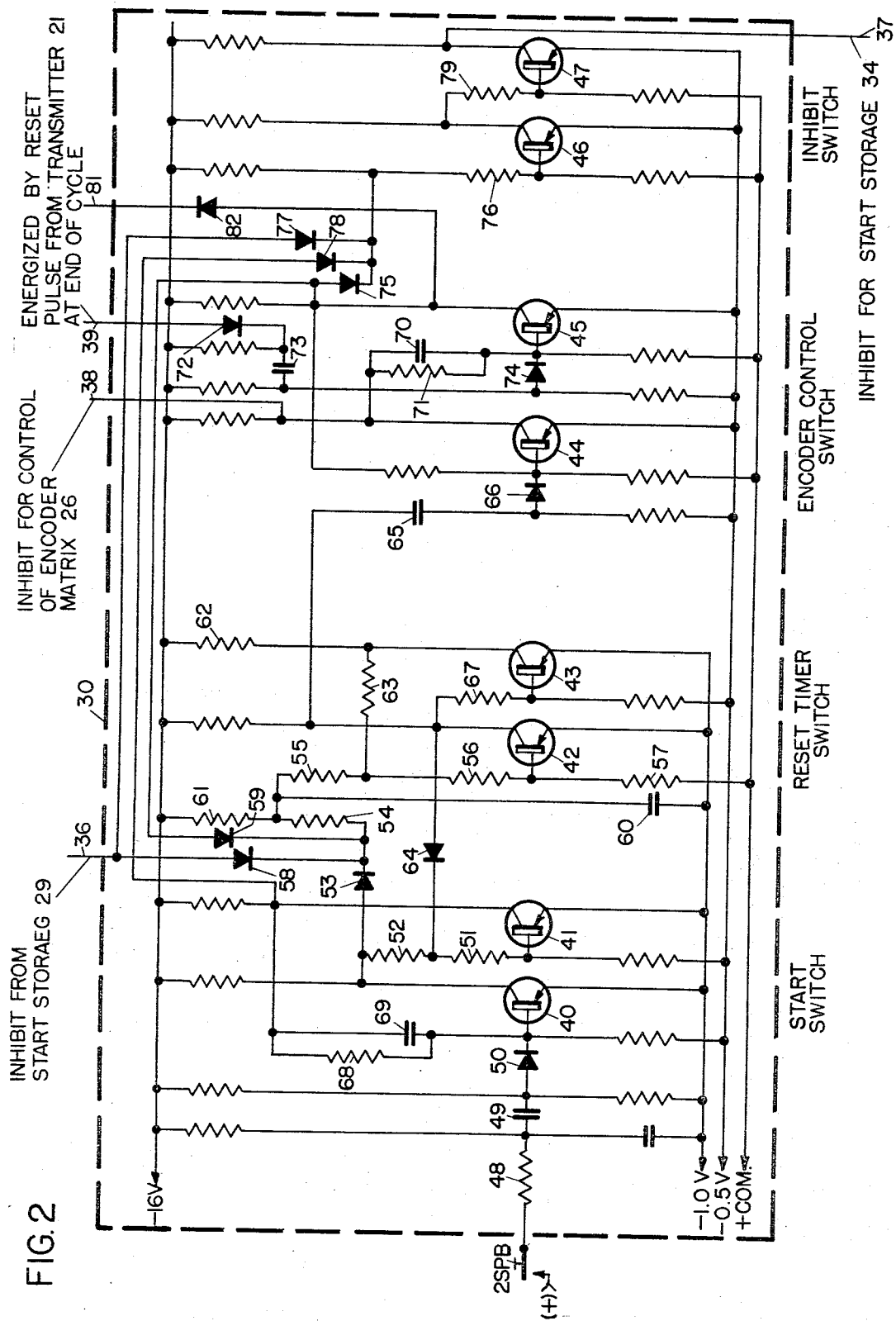
FIG. 2 illustrates in detail the start storage, control, and inhibit circuits used at the control office to control transmission to a typical field location.

With reference to FIG. 2, the typical Start Storage 30 (similar to Start Storage 29 and 34 in FIG. 1) includes a Start Switch having transistors 40 and 41, a Reset Timer Switch having transistors 42 and 43, an Encoder Control Switch having transistors 44 and 45 and an Inhibit Switch having transistors 46 and 47. The Start Switch, including transistors 40 and 41, is used to store a start designation that is made by the actuation of the push button 2SPB. The transistor 40 is normally turned on, and the transistor 41 is normaly turned off. When a start is designated by the actuation of the push button 2SPB, a start pulse is applied through push button 2SPB, resistor 48, capacitor 49 and diode 50 to the base of transistor 40. The positive pulse applied to the base of transistor 40 causes that transistor to be turned off, and the turning off of transistor 40 causes the transistor 41 to be turned on. Transistor 41 is turned on because its base is connected to the collector of transistor 40 through resistors 51 and 52.

The Reset Timer Switch (see FIG. 2) having transistors 42 and 43 has its transistor 42 normally turned off and its transistor 43 normally turned on. The transistor 42 is maintained turned off in accordance with the energization with positive energy of any one of three inhibit circuits. One of these inhibit circuits extends from the collector of transistor 40, through diode 53, resistor 54, resistor 55, resistor 56, and resistor 57. The base of transistor 42 is connected to a point between the resistors 46 and 47. Inhibit energy on this circuit is removed when the transistor 40 is turned off in accordance with the designation of a start control as has been heretofore described.

The turning on of transistor 42 is also inhibited if there is an output of inhibit energy by the next prior storage in the chain of storages. Thus if inhibit energy is applied to wire 36 by Start Storage 29, this energy is applied to the base of transistor 42 through wire 36, diode 58, resistor 54, resistor 55, and resistor 56. This prevents the transistor 42 from being turned on in accordance with a storage registered in the associated Start Switch by the turning off of transistor 40.

A third inhibit circuit is provided for the transistor 42 to render it nonresponsive to the actuation of the Start Switch of Start Storage 30 when the associated Encoder Control Switch is turned on. Under these conditions, inhibit energization is applied to the base of transistor 42 from the collector of transistor 45 through diode 59, resistor 54, resistor 55, and resistor 56. Thus the transistor 42 can be turned on only provided that a start is stored by the Start Switch comprising transistors 40 and 41, only provided that there is no inhibit energization applied to wire 36 by the next preceding Start Storage unit 29, and only provided that the Encoder Control Switch of the associated unit is not turned on by the turning on of transistor 45.

Assuming that inhibit energization is removed contemporaneously from all three of the previously described circuits, the capacitor 60 becomes charged to a higher potential due to the reduction in the potential drop across resistor 61 because of transistor 40 having been turned off. This causes transistor 42 to be turned on which in turn causes transistor 43 to be turned off in accordance with the connection of the collector of transistor 42 to the base of transistor 43 through resistor 67. The turning off of transistor 43 renders a circuit effective through resistors 62, 63, 56 and 57 to make the base of transistor 42 more negative and thus maintain transistor 42 turned on until capacitor 60 becomes discharged to a substantially lower voltage than that needed to turn transistor 42 on. The charge on the capacitor 60 delays the turning off of the transistor 42 and the turning on of transistor 43 for a time interval determined by the rate of discharge of that capacitor.

Immediately in response to the turning on of transistor 42, the Start Switch is reset by the turning off of transistor 41 and the turning on of transistor 40. Transistor 41 is turned off because of the connection of the collector of transistor 42 to the base of transistor 41 through diode 64 and resistor 51. The transistor 40 becomes turned on because of the connection of the collector of transistor 41 to the base of transistor 40 through resistor 68 and capacitor 69 connected in multiple. The Encoder Control Switch is also turned on in response to the turning on of transistor 42 in accordance with the connection of the collector of transistor 42 to the base of transistor 44 through capacitor 65 and diode 66. The turning off of transistor 44 causes the transistor 45 to be turned on because of the connection of the collector of transistor 44 to the base of transistor 45 through capacitor 70 and resistor 71 connected in multiple.

The transistor 42 is maintained turned on for a time interval determined by the charge on the capacitor 60 to insure the resetting of the Start Switch and the actuation of the Encoder Control Switch and to prevent the possibility of a second start being registered by the Start Switch in response to a single actuation of the start button 2SPB because of contact bounce in the start button 2SPB, or the like. Contact bounce could occur particularly if the push button 2SPB were replaced by a relay contact. At the time when the transistor 40 becomes turned on, a discharge circuit for the capacitor 60 is closed through transistor 40, diode 53 and resistor 54 so as to reduce the potential of that capacitor to turn off the transistor 42 and to permit the transistor 43 to be turned on to restore to normal the conditions of the Reset Timer Switch. After the transistor 42 has been turned off, the Start Switch including the transistors 40 and 41 is conditioned to store a subsequent start in case the push button 2SPB is actuated for a second time.

As has been heretofore poined out, the Encoder Control Switch is normally effective to apply inhibit energization to the wire 38 extending to the Encoder Matrix 26 to render the transmission of a code selected by that matrix ineffective. This is in accordance with the transistor 44 being turned on. This transistor is turned off, as has been described, for initiation of a cycle of operation for transmission to the corresponding field location, and in accordance with the turning off of this transistor, inhibit energization is removed from the wire 38 to initiate and permit the transmission of a selected control code to the field location No. 2. The transistors 44 and 45 of the Encoder Control Switch remain in their respective turned off and turned on conditions until the end of the control cycle that is transmitted to field location No. 2.

At the end of the control cycle, a reset pulse is applied to wire 39 by the Normally Inactive Code Transmitter 21 to reset the Encoder Control Switch to its normal position. This is accomplished by the connection of wire 39 to the base of transistor 45 through diode 72, capacitor 73, and diode 74. From the above described mode of operation, it will be apparent that the Encoder Control Switch of Start Storage 30 normally inhibits its Encoder Matrix 26 over wire 38, but such inhibit energization is removed if a start is registered by the operation of the associated Reset Timer Switch. The Encoder Control Switch remains in its operated position throughout the transmission of a cycle during which the Encoder Matrix 26 selects the code, and is reset by the application of a pulse at the end of the cycle to the reset input wire 39.

The transistors 46 and 47 of the Inhibit Switch are normally on and off respectively, and in this condition, negative energization is applied to the inhibit output wire 37, but this energization is not of the proper polarity to be effective as an inhibit. The transistor 46 is turned off and the transistor 47 is turned on to cause a positive inhibit energization to be applied to wire 37 under any one of three different conditions. One of these conditions is that the Encoder Control Switch is turned on so that the transistor 45 is turned on, a second condition is that positive inhibit polarity is applied to the input wire 36 from the Start Storage 29 and the third condition is that the transistor 41 of the Start Switch of the associated Start Storage 30 is turned on in accordance with a start for that storage having been designated. Energization from either of these three sources provides a reverse bias for the transistor 46 to cause that transistor to be turned off and transistor 47 to be turned on. The turning on of the transistor 47 provides a positive output on the inhibit wire 37 to inhibit the next Start Storage 34.

To consider the circuits more specifically for providing the above described mode of operation, the base of transistor 46 is subject to reverse bias by the output of transistor 45 in accordance with the connection of the collector of transistor 45 to the base of transistor 46 through diode 75 and resistor 76. The input inhibit wire 36 is connected to the base of transistor 46 through diode 77 and resistor 76. The collector of transistor 41 is connected to the base of transistor 46 through diode 78 and resistor 76. Forward bias is applied to transistor 47 when transistor 46 is turned off in accordance with the connection of the collector of transistor 46 to the base of transistor 47 through resistor 79.

The Inhibit Switch of the Start Storage 30 is restored to its normal condition when the reverse bias is removed from the base of transistor 46 at the end of a control cycle upon the resetting of the Encoder Control Switch for the associated station, provided there is no other inhibit energization applied to the base of the transistor 46.

It is to be understood that the Start Storage 34 (see FIG. 1) is similar to the Start Storage 30 that has been described in detail except that it is not reset until a cycle of operation has been transmitted for each of the plurality of stations at the associated location No. 3. In other words, instead of the Start Storage 34 being reset by a reset pulse applied to wire 39 by the Normally Inactive Code Transmitter 21, it is reset only after a cycle of operation has been transmitted for each station at location No. 3 in response to a reset pulse applied to wire 80 by the Encoder Matrix 28 at the end of the last control cycle. Wire 80 is connected to a terminal of Start Storage 34 corresponding to wire 39 (see FIG. 2) of Start Storage 30.

The Station Counter 31 is enabled when positive energy is applied to wire 81 (see FIG. 1). This wire is shown in the typical-start storage circuits illustrated in detail in FIG. 2, although this wire is not used for Start Storage 30 because there is no counter controlled by that storage. Wire 81 is energized to render the Station Counter 31 operable when the associated Start Storage 34 has its transistor 45 (see FIG. 2) of the Encoder Control Switch turned on. The collector of transistor 45 is connected to wire 81 through diode 82.

It is therefore provided that when the Start Storage 34 turns on its Encoder Control Switch, the Station Counter 31 is rendered operable to count cycles of operation of the Transmitter 21. This counting is done by counting pulses applied by the Transmitter 21 to wire 39 (see FIG. 1) one pulse being applied at the end of each cycle transmitter. The operation of the Station Counter 31 is effective to selectively render the Encoder Matrices 27 and 28 effective to control the code applied during successive cycles by the Transmitter 21. The Encoder Matrices 28 and 29 are normally inhibited by the Start Storage 34 the same as has been described for inhibiting the Encoder Matrix 26 by the energization of wire 38. The Station Counter 31 is reset in accordance with the resetting of the Encoder Control Switch of Start Storage 34 when wire 80 is energized after the last station of the group associated with that storage has had its code transmitted to complete the scanning for controls of all stations of that group.

Having thus described a normally inactive code communication system comprising one embodiment of the present invention, it is desired to be understood that this form is selected to facilitate the disclosure of the principles of operation of the present invention rather than to limit the number of forms which the present invention may assume, and it is to be further understood that various alterations, adaptations and modifications may be applied to the specific form shown in accordance with the requirements of practice within the scope of the present invention except as limited by the appended claims.

What I claim is:

1. In a normally inactive code communication system for transmitting selected codes during respective cycles of operation of the system from a transmitting station to a plurality of field locations over a communication channel, (a) start designating means at the transmitting station for each location for designating a start for the the transmission of codes to the associated location, (b) start storage and control means at the transmitting station for each location controlled in response to the deignation of a start for that locaion by said start designating means for initiating the transmission of a selected code to the associated location over the communication channel, (c) said storage and control means having a start storage for storing a start that has been designated by said start designating means, (d) said storage and control means having an encoder control switch for controlling transmission of codes to the associated field location, (e) said storage and control means having a reset switch controlled by said start storage for controlling said encoder control switch and for resetting said start storage, and (f) means for selectively applying inhibit energization from said storage and control means for one location to said storage and control means for another location when a start is stored by said start storage of said one location for inhibiting the operation of said encoder control switch of said start storage and control means for said another location.

2. The invention according to claim 1 wherein said encoder control switch of said start storage and control means for one location is controlled in part by inhibit energization from said start storage and control means for another station.

3. The invention according to claim 2 wherein said start storage and control means for each location has an inhibit input and an inhibit output and the inhibit inputs and outputs of the several start storage and control means are connected in series.

4. In a normally inactive code communication system for transmitting selected codes during respective cycles of operation of the system from a transmitting station to a plurality of field locations over a communication channel,
(a) designating means for selectively designating a start for initiating transmission to any of the locations,
(b) start storage and control means at the transmitting station for each of the locations for initiating the transmission of a selected code to the associated location,
(c) said start storage and control means having an encoder control switch responsive to the designation of a start by said designating means for the associated location for controlling and transmission of codes to the associated location, and
(d) said storage and control means having a binary inhibit switch controlled by inhibit energy from the start storage and control means for another location for governing the application of inhibit energy to the encoder control switch of the start storage means for a third location.

5. In a normally inactive code communication system for transmitting selected codes during respective cycles of operation of the system from a transmitting station to a plurality of field locations over a communication channel,
(a) start designating means at the transmitting station for each location for designating a start for the transmission of codes to the associated location,
(b) start storage and control means at the transmitting station for each location controlled in response to the designation of a start for that location by said start designating means for storing the designated start condition and for initiating the transmission of a selected code to the associated location over the communication channel,
(c) said storage and control means for each location having a start storage switch and an encoder control switch,
(d) inhibit circuit means for connecting said start storage and control means for the several field locations in series and providing an inhibit input to each of said start storage and control means when said encoder control switch belonging to any of the several locations is operated to a distinctive condition, and
(e) means for controlling said encoder control switch to said distinctive condition in response to a storage in said storage switch for the same location except when an inhibit input is applied to the start storage and control means for the associated location by said inhibit circuit means.

6. The invention according to claim 5 wherein said inhibit control means includes an inhibit switch for each location that is subject to control either by the encoder control switch for the associated station or by inhibit energy input from the inhibit switch for another location.

7. The invention according to claim 6 wherein each of said switches comprises a plurality of electronic solid state devices.

8. The invention according to claim 7 wherein at least one of the locations has a plurality of stations requiring a separate cycle of operation of the communication system for each station, and counting means is provided for sequencing transmission to all of said stations in a predetermined order provided that a start has been designated for the associated location and provided that the start storage and control means for the associated station is not inhibited by said inhibit means.

References Cited

UNITED STATES PATENTS

| | | | |
|---|---|---|---|
| 3,040,297 | 6/1962 | Derr et al. | 340—150 |
| 3,117,303 | 1/1964 | Byrne | 340—147 |
| 3,300,758 | 1/1967 | Hawley | 340—147 |

NEIL C. READ, *Primary Examiner.*

D. YUSKO, *Assistant Examiner.*